United States Patent
Johnson

(10) Patent No.: US 9,623,974 B2
(45) Date of Patent: Apr. 18, 2017

(54) AIRCRAFT ENVIRONMENTAL CONTROL SYSTEM AND METHOD

(71) Applicant: The Boeing Company, Chicago, IL (US)

(72) Inventor: Andrew T. Johnson, Everett, WA (US)

(73) Assignee: The Boeing Company, Chicago, IL (US)

(*) Notice: Subject to any disclaimer, the term of this patent is extended or adjusted under 35 U.S.C. 154(b) by 201 days.

(21) Appl. No.: 14/670,607

(22) Filed: Mar. 27, 2015

(65) Prior Publication Data

US 2015/0197339 A1 Jul. 16, 2015

Related U.S. Application Data

(62) Division of application No. 13/343,059, filed on Jan. 4, 2012, now Pat. No. 9,016,075.

(51) Int. Cl.
| | |
|---|---|
| *F25B 9/00* | (2006.01) |
| *B64D 13/08* | (2006.01) |
| *F25B 9/06* | (2006.01) |
| *F25B 11/02* | (2006.01) |
| *B64D 13/02* | (2006.01) |
| *B64D 13/06* | (2006.01) |

(52) U.S. Cl.
CPC ............ *B64D 13/08* (2013.01); *B64D 13/02* (2013.01); *B64D 13/06* (2013.01); *F25B 9/004* (2013.01); *F25B 9/06* (2013.01); *F25B 11/02* (2013.01); *B64D 2013/0603* (2013.01); *B64D 2013/0644* (2013.01); *F25B 9/065* (2013.01); *Y02T 50/56* (2013.01)

(58) Field of Classification Search
CPC B64D 13/08; B64D 13/02; B64D 2013/0603; B64D 13/06; B64D 2013/0644; F25B 9/004; F25B 9/06; F25B 9/065; F25B 11/02; Y02T 50/56
See application file for complete search history.

(56) References Cited

U.S. PATENT DOCUMENTS

| | | |
|---|---|---|
| 5,813,630 A | 9/1998 | Williams |
| 6,144,897 A | 11/2000 | Selliers |
| 6,381,973 B1 * | 5/2002 | Bhatti ............... B60H 1/00007 62/172 |
| 6,681,592 B1 | 1/2004 | Lents et al. |
| 6,928,832 B2 | 8/2005 | Lents et al. |
| 2013/0051973 A1 | 2/2013 | Figura et al. |

* cited by examiner

*Primary Examiner* — Len Tran
*Assistant Examiner* — Ana Vazquez
(74) *Attorney, Agent, or Firm* — Walters & Wasylyna LLC

(57) ABSTRACT

An environmental control system including a turbomachine assembly having a shaft, motor, turbine and compressor, the compressor outputting a compressed air stream, a first valve that splits the compressed air stream into first and second compressed air streams, a heat exchanger to cool the first compressed air stream and output a cooled air stream, a second valve positioned to receive the cooled air stream and split the cooled air stream into first and second cooled air streams, wherein the first cooled stream is expanded in the turbine to produce an expanded air stream that is combined with the second compressed air stream and the second cooled air stream to provide a combined air stream having a temperature and a flow rate, and a controller that communicates control signals to the compressor, motor and first and second valves to control the temperature and flow rate of the combined air stream.

15 Claims, 4 Drawing Sheets

AIRCRAFT ENVIRONMENTAL CONTROL SYSTEM AND METHOD

PRIORITY

This application is a divisional of, and claims priority from, U.S. Ser. No. 13/343,059 filed on Jan. 4, 2012.

FIELD

The present disclosure relates to environmental control systems and methods for aircraft with pressurized cabins and, more particularly, to aircraft environmental control systems and methods that utilize dedicated cabin air compressors to compress air.

BACKGROUND

Bleed air, or compressed air obtained from within an aircraft's main engines, has traditionally been used to pressurize the aircraft cabin and cargo hold. However, the temperature of this compressed air is typically much higher than required and must be cooled prior to its injection into the cabin. Cooling bleed air in older aircraft required a vapor cycle refrigeration system, which was heavy, expensive and required excessive maintenance. More modern aircraft have eliminated the vapor cycle refrigeration by replacing it with an air cycle system. In addition to an air cycle system, a series of ducts, valves and other heavy equipment requiring intensive maintenance are required to operate this system. Thus, this system is also large, complex, not energy efficient, can overtax the main engine compressors, and results in poor fuel consumption by the aircraft.

Current technological advances have overcome drawbacks presented by bleed air systems by utilizing dedicated separate cabin air compressors to provide compressed air to the aircraft cabin and cargo ventilation systems that is not sourced from the main engines of the aircraft. The pressurized air sourced from these dedicated cabin air compressors is matched to the required pressure so the system is able to operate with a more modest refrigeration system. When warmer air is needed, the compressors can be operated less efficiently to provide warmer air at the same pressure. However, this approach of using additional, large, high speed mechanical equipment, such as separate cabin air compressors, adds excess weight, reliability and complexity challenges to the aircraft.

Given the benefits and drawbacks presented by both types of existing technology, there exists a need for an airplane environmental system that utilizes a single efficient, simple, lightweight, turbomachine that can be controlled to achieve the desired temperature and flow of air to the cabin without the need for additional mechanical equipment.

SUMMARY

In one aspect, the disclosed environmental control system may include a turbomachine assembly having a shaft, a motor, a turbine and a compressor, the compressor outputting a compressed air stream, a first valve that splits the compressed air stream into first and second compressed air streams, a heat exchanger to cool the first compressed air stream and output a cooled air stream, a second valve positioned to receive the cooled air stream and split the cooled air stream into first and second cooled air streams, wherein the first cooled stream is expanded in the turbine to produce an expanded air stream that is combined with the second compressed air stream and the second cooled air stream to provide a combined air stream having a temperature and a flow rate, and a controller that communicates control signals to the compressor, the motor and the first and second valves to control the temperature and flow rate of the combined air stream.

In another aspect, the disclosed environmental control system may include (1) a turbomachine assembly having a compressor, a motor and a turbine, wherein the compressor has a variable compressor geometry and is driven by a shaft to output a compressed air stream, wherein the motor is coupled to the shaft and has a variable motor power, and wherein the turbine is coupled to the shaft; (2) a first valve having a first variable splitting state to selectively divide the compressed air stream into a first compressed air stream and a second compressed air stream; (3) a heat exchanger positioned to cool the first compressed air stream and output a cooled air stream; (4) a second valve having a second variable splitting state to selectively divide the cooled air stream into a first cooled air stream and a second cooled air stream, wherein the first cooled air stream is coupled to the turbine such that the turbine expands the first cooled air stream as the first cooled air stream passes through the turbine, thereby producing an expanded air stream, and wherein the expanded air stream is combined with the second compressed air stream and the second cooled air stream to provide a combined air stream, the combined air stream having a temperature and a flow rate; and (5) a controller configured to control the temperature and the flow rate of the combined air stream by controlling, at least, the variable compressor geometry, the variable motor power, the first variable splitting state and the second variable splitting state.

In yet another aspect, disclosed is an environmental control method. The method includes the steps of (1) providing a turbomachine assembly comprising a compressor, a motor and a turbine, wherein said compressor has a variable compressor geometry and is driven by a shaft, said motor and said turbine being coupled to said shaft, said motor being configured to selectively supply rotational power to said shaft; (2) obtaining an input air stream; (3) passing said input air stream through said compressor to obtain a compressed air stream; (4) providing a first valve configured to selectively split said compressed air stream into a first compressed air stream and a second compressed air stream; (5) cooling said first compressed air stream to obtain a cooled air stream; (6) providing a second valve configured to selectively split said cooled air stream into a first cooled air stream and a second cooled air stream; (7) passing said first cooled air stream though said turbine to obtain a turbine output stream, wherein said step of passing said first cooled air stream through said turbine supplies rotational power to said shaft; (8) combining said turbine output stream with said second cooled air stream and said second compressed air stream to obtain a combined air stream, said combined air stream having a temperature and a flow rate; and (9) controlling said compressor geometry, said motor, said first valve and said second valve to minimize a first difference between said temperature and a target temperature and a second difference between said flow rate and a target flow rate.

Other aspects of the disclosed environmental control system and method will become apparent from the following detailed description, the accompanying drawings, and the appended claims.

DETAILED DESCRIPTION

Figure 1:
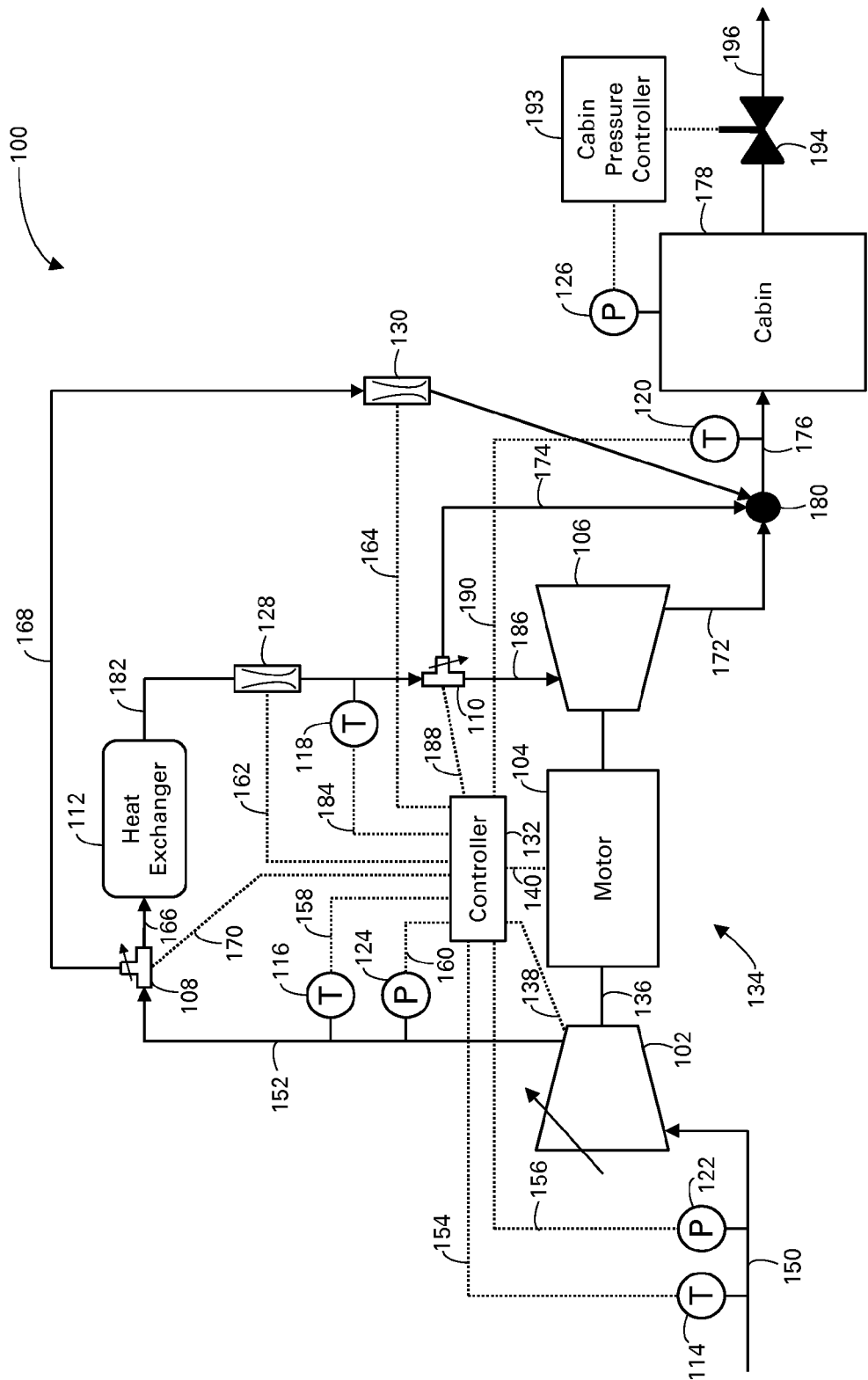
FIG. 1 is a schematic representation of a first embodiment of the disclosed aircraft environmental control system.

Referring to FIG. 1, a first embodiment of the disclosed aircraft environmental control system, generally designated 100, may include a compressor 102, a motor 104, a turbine 106, first and second valves 108, 110, a heat exchanger 112, temperature sensors 114, 116, 118, 120, pressure sensors 122, 124, 126, flow sensors 128, 130 and a controller 132. Additional components, such as additional temperature, pressure and flow sensors, may be included as part of the disclosed aircraft environmental control system 100 without departing from the scope of the present disclosure.

The compressor 102, the motor 104 and the turbine 106 may be assembled as a turbomachine assembly 134. Specifically, the compressor 102 may be driven by a shaft 136, and both the motor 104 and the turbine 106 may supply rotational power to the shaft 136. Therefore, the motor 104 may only be required to draw electrical power sufficient to make up the difference between the rotational power supplied by the turbine 106 and the desired amount of rotational power to be supplied to the compressor 102.

The compressor 102 may be a variable geometry air compressor. Therefore, the geometry of the compressor 102 may be actively controlled in response to control signals (communication line 138) received from the controller 132. However, use of a fixed geometry compressor is also contemplated.

The motor 104 may be an electric motor or the like, and may selectively supply rotational power to the shaft 136 to drive the compressor 102. The amount of power supplied by the motor 104 to the shaft 136 may be controlled by the controller 132, which may communicate control signals (communication line 140) to the motor 104.

The turbine 106 may be a fixed geometry turbine, and may supply rotational power to the shaft 136 to drive the compressor 102. However, use of a variable geometry turbine is also contemplated. Those skilled in the art will appreciate that use of a variable geometry turbine may introduce another parameter (turbine geometry) that may be controlled by the controller 132 to achieve the desired output.

The controller 132 may be any apparatus or system capable of generating control signals for controlling the compressor 102, the motor 104, the turbine 106, and the first and second valves 108, 110 based on input signals received from the temperature sensors 114, 116, 118, 120, the pressure sensors 122, 124, 126, and the flow sensors 128, 130 to achieve a cabin air stream 176 having the desired temperature and flow rate. For example, the controller 132 may be a computer processor or the like that has been pre-programmed with one or more control algorithms configured to control the cabin air stream temperature and flow rate.

An input air stream 150 may be supplied to the compressor 102, where it may be compressed and output as a compressed air stream 152. The input air stream 150 may come from a ram air duct.

The input air stream 150 will be at a temperature and pressure. The pressure sensor 122 may sense the pressure of the input air stream 150, and may communicate to the controller 132 a signal indicative of the pressure of the input air stream 150 by way of communication line 156. The compressor 102 inlet temperature may be determined from the compressor inlet pressure sensed by pressure sensor 122 and airplane data typically available to the controller 132. Alternatively, the compressor 102 inlet temperature may be measured directly by way of optional temperature sensor 114, which may communicate to the controller 132 a signal indicative of the temperature of the input air stream 150 by way of communication line 154.

The temperature and pressure of the input air stream 150 depend on the source of the input air stream 150 and/or the ambient conditions. For example, when the aircraft is on a tarmac in a warm climate, the temperature and pressure of the input air stream 150 may be relatively higher than when the aircraft is moving at altitude. Therefore, the signals (communication lines 154, 156) received by the controller 132 may be used by the controller 132 to generate control signals.

The compressed air stream 152 output by the compressor 102 may be at a temperature and pressure, which may be measured by temperature sensor 116 and pressure sensor 124. The temperature sensor 116 may communicate to the controller 132 a signal indicative of the temperature of the compressed air stream 152 by way of communication line 158. The pressure sensor 124 may communicate to the controller 132 a signal indicative of the pressure of the compressed air stream 152 by way of communication line 160.

The flow rate of the compressed air stream 152 output by the compressor 102 may be measured by the flow sensors 128, 130. While a dedicated flow sensor is not shown on the compressed air stream 152, those skilled in the art will appreciate that the flow rate of the compressed air stream 152 may be derived by totaling the flow rates measured by both flow sensor 128 and flow sensor 130. The flow sensors 128, 130 may communicate to the controller 132 signals indicative of the measured flow rates by way of communication lines 162, 164.

The flow sensors 128, 130 may optionally include pressure and temperature information. For example, the flow sensors 128, 130 may be venturi or turbine flow sensors, which may require pressure and temperature information to obtain a reliable measurement. However, flow sensors that do not require pressure and temperature information, such as anemometer flow sensors, are also contemplated.

Thus, the temperature, pressure and flow rate of the compressed air stream 152 may be dictated by, among other things, the geometry of the compressor 102 and the rotational power supplied to the compressor 102 by the shaft 136, both of which may be controlled by the controller 132.

The compressed air stream 152 may be split at the first valve 108 into a heat exchanger stream 166 and a heat exchanger bypass stream 168. The first valve 108 may be controlled by the controller 132 by way of communication line 170. The control signal communicated by the controller 132 to the first valve 108 may control the split between the heat exchanger stream 166 and the heat exchanger bypass stream 168. Therefore, the first valve 108 may control the division of the flow between the heat exchanger stream 166 and the heat exchanger bypass stream 168.

Optionally, the first valve 108 (or an additional valve unit) may also control the total impedance across the first valve 108. Therefore, by controlling the impedance, the first valve 108 may control the flow rate downstream of the first valve 108.

The heat exchanger bypass stream 168 may bypass the heat exchanger 112, and may be combined with the turbine output stream 172 and the turbine bypass stream 174 at combination point 180. The combination of the heat exchanger bypass stream 168, the turbine output stream 172 and the turbine bypass stream 174 may form the cabin air stream 176, which may flow into the cabin 178.

The heat exchanger bypass stream 168 will have a temperature, a pressure and a flow rate. The temperature of the heat exchanger bypass stream 168 may be substantially the same as the temperature of the of the compressed air stream 152, though additional temperature and pressure sensors (not shown) may be provided on the heat exchanger bypass stream 168 without departing from the scope of the present disclosure. The flow rate of the heat exchanger bypass stream 168 may be measured by flow sensor 130. Flow sensor 130 may communicate to the controller 132 a signal indicative of the flow rate of the heat exchanger bypass stream 168 by way of communication line 164.

The heat exchanger stream 166 may pass through the heat exchanger 112. The heat exchanger 112 may cool the heat exchanger stream 166 and may output a cooled stream 182. The heat exchanger 112 may be any apparatus or system capable of cooling the heat exchanger stream 166. For example, the heat exchanger 112 may be capable of cooling the heat exchanger stream 166 approximately to ambient conditions.

The cooled stream 182 may exit the heat exchanger 112 at a temperature, pressure and flow rate, which may be measured by temperature sensor 118 and flow sensor 128. The temperature sensor 118 may communicate to the controller 132 a signal indicative of the temperature of the cooled stream 182 by way of communication line 184. The flow sensor 128 may communicate to the controller 132 a signal indicative of the flow rate of the cooled stream 182 by way of communication line 162. The pressure of the cooled stream 182 may be substantially the same as the pressure of the compressed air stream 152, though an additional pressure sensor (not shown) may be provided on the cooled stream 182 without departing from the scope of the present disclosure.

Thus, the controller 132 may communicate control signals to the first valve 108 by way of communication line 170 to control the flow rates of the heat exchanger stream 166 and the heat exchanger bypass stream 168. Additionally, the control signals communicated to the first valve 108 may control the split between the heat exchanger stream 166 and the heat exchanger bypass stream 168, thereby controlling the amount (e.g., percentage) of the compressed air stream 152 that is cooled by the heat exchanger 112.

The cooled stream 182 may be supplied to the second valve 110, which may split the cooled stream 182 into a turbine input stream 186 and the turbine bypass stream 174. The second valve 110 may be controlled by the controller 132 by way of communication line 188. The control signal communicated by the controller 132 to the second valve 110 may control the split between the turbine input stream 186 and the turbine bypass stream 174. Therefore, the second valve 110 may control the flow rate downstream of the second valve, as well as the division of the flow between the turbine input stream 186 and the turbine bypass stream 174.

The turbine bypass stream 174 may bypass the turbine 106, and may be combined with the turbine output stream 172 and the heat exchanger bypass stream 168 at combination point 180.

The turbine bypass stream 174 may have a temperature, which may be substantially the same as the temperature of the cooled stream 182. However, additional temperature, pressure and flow sensors (not shown) may be provided on the turbine bypass stream 174 without departing from the scope of the present disclosure.

The turbine input stream 186 may pass through the turbine 106. The turbine 106 may expand the turbine input stream 186, thereby outputting a cooled turbine output stream 172. The energy extracted by the turbine 106 from the turbine input stream 186 is supplied to the shaft 136 to drive the compressor 102.

The turbine output stream 172 may be combined with the turbine bypass stream 174 and the heat exchanger bypass stream 168 at combination point 180 to form the cabin air stream 176, which may be supplied to the cabin 178.

The cabin air stream 176 may enter the cabin 178 at a controlled temperature and flow rate. The temperature of the cabin air stream 176 may be measured by temperature sensor 120, which may communicate to the controller 132 a signal indicative of the measured temperature by way of communication line 190. The flow rate of the cabin air stream 176 may be derived from the total flow measured by both flow sensors 128, 130, though a dedicated flow sensor (not shown) may be provided on the cabin air stream without departing from the scope of the present disclosure.

Thus, the controller 132 may control both the temperature and the flow rate of the cabin air stream 176. Specifically, the controller 132 may generate control signals and may communicate (by way of communication lines 138, 140, 170, 188) the control signals to the compressor 102, the motor 104, the first valve 108 and the second valve 110 based on input signals received (by way of communication lines 154, 156, 158, 160, 162, 164, 184, 190) from the temperature sensors 114, 116, 118, 120, the pressure sensors 122, 124, 126, and the flow sensors 128, 130. The controller 132 may also ensure that the pressure of the cabin air stream 176 is greater than the pressure of the cabin 178 to ensure positive airflow into the cabin 178.

An outflow valve 194 may control the flow rate of the outflow stream 196 from the cabin 178, thereby maintaining the desired pressure within the cabin 178. A separate cabin pressure controller 193 may be provided to control the pressure in the cabin 178 by controlling the outflow valve 194 based on cabin pressure signals supplied to the controller 193 by the cabin pressure sensor 126. Controlling the cabin pressure with only one controller is also contemplated.

Figure 2:
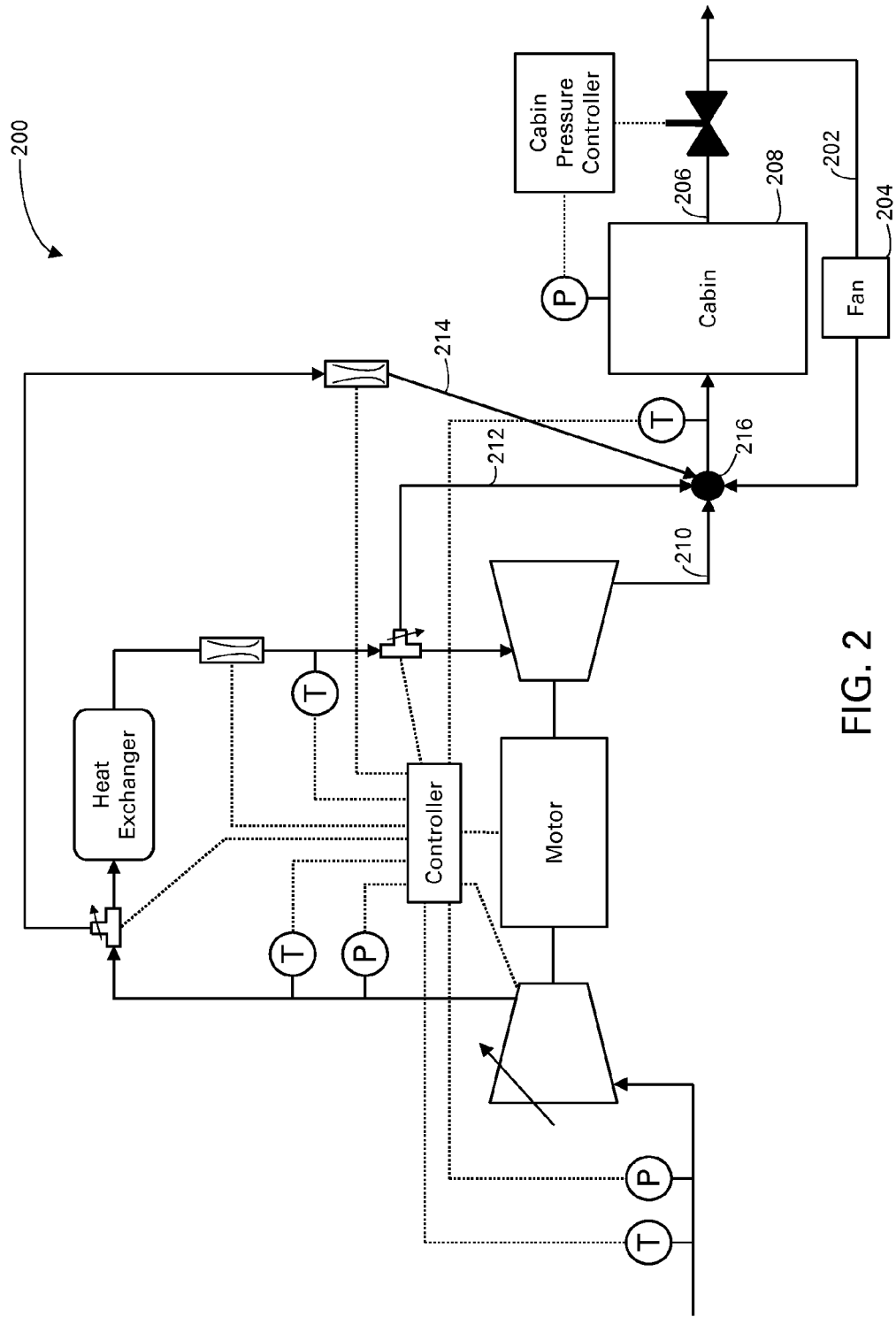
FIG. 2 is a schematic representation of a second embodiment of the disclosed aircraft environmental control system.

Referring to FIG. 2, a second embodiment of the disclosed aircraft environmental control system, generally designated 200, may generally retain the architecture of the system 100 shown in FIG. 1, but may additionally include a recirculation stream 202. A recirculation fan 204 may move air along the recirculation stream 202.

In one implementation of the second embodiment, the recirculation stream 202 draws air from the cabin 208, and may combine the recirculation stream 202 with the turbine output stream 210, the turbine bypass stream 212 and the heat exchanger bypass stream 214 at combination point 216 to form the cabin air stream 218, which may be supplied to the cabin 208.

Other implementations, such as implementations in which the recirculation stream 202 is introduced at other points in the system 200 (i.e., at points other than combination point 216), are also contemplated.

Figure 3:
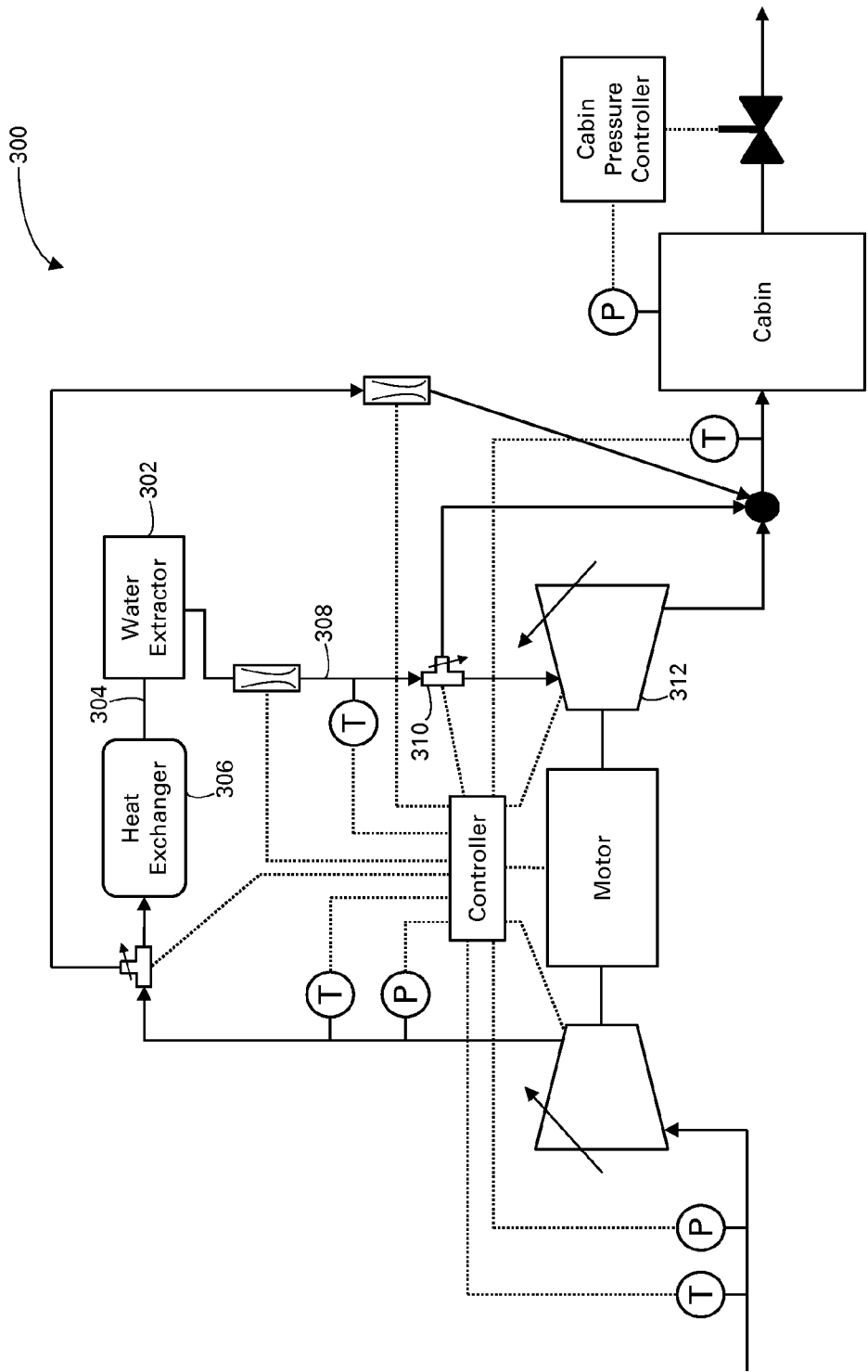
FIG. 3 is a schematic representation of a third embodiment of the disclosed aircraft environmental control system.

FIG. 3 illustrates a third embodiment of the disclosed aircraft environmental control system, generally designated 300, which may generally retain the architecture illustrated in FIG. 1, but may additionally include a water extractor 302.

The water extractor 302 may receive the cooled stream 304 from the heat exchanger 306, and may remove water vapor from the cooled stream 304. Therefore, the output from the water extractor 302 may be a cooled dry stream 308, which may be supplied to the second valve 310.

While the water extractor 302 is schematically shown as a box in the drawings, those skilled in the art will appreciate that the water extractor 302 may include a recirculation loop that passes through the turbine 312, which optionally may be a variable geometry turbine.

Figure 4:
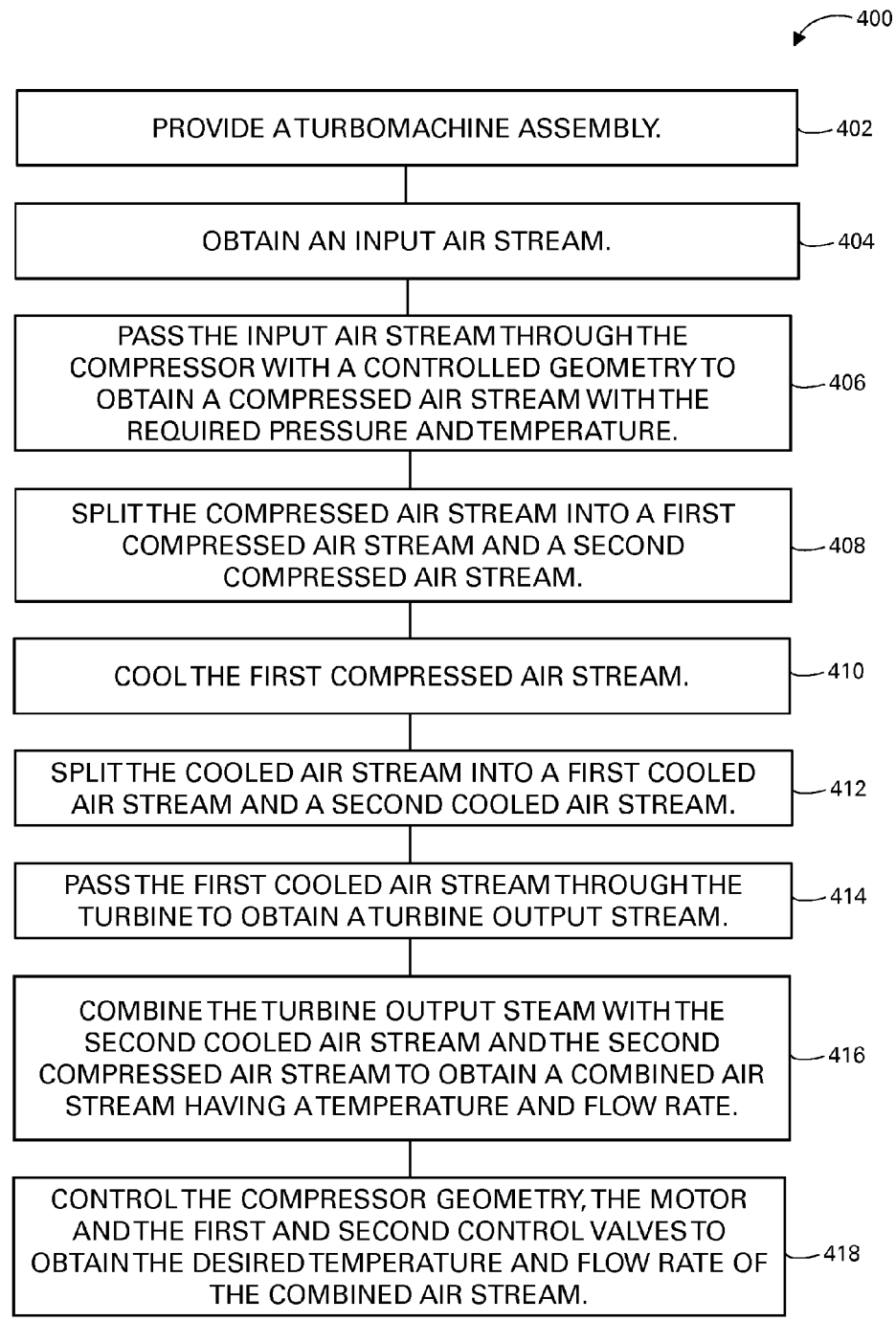
FIG. 4 is a flow chart depicting one aspect of the disclosed environmental control method.

Referring to FIG. 4, also disclosed is a method 400 for controlling the temperature and flow rate of an air stream, such as a cabin air stream supplied to the cabin of an aircraft. As shown at block 402, the method 400 may begin with the step of providing a turbomachine assembly. The turbomachine assembly may include a compressor, a motor and a turbine. The compressor may have a variable compressor geometry and may be driven by a shaft. The motor and the turbine may both be coupled to the shaft to supply rotational power to the shaft.

As shown at block 404, an input air stream may be obtained. Then, as shown at block 406, the input air stream may be passed through the compressor to obtain a compressed air stream.

A first valve may be provided, as shown at block 408. The first valve may be controllable to selectively split the compressed air stream into a first compressed air stream and a second compressed air stream. As shown at block 410, the first compressed air stream may be cooled, such as by passing the first compressed air stream through a heat exchanger, thereby providing a cooled air stream.

A second valve may be provided, as shown at block 412. The second valve may be controllable to selectively split the cooled air stream into a first cooled air stream and a second cooled air stream. As shown at block 414, the first cooled air stream may be expanded and, thus further cooled, by passing the first cooled air stream through a turbine, thereby providing a turbine output stream. The step of passing the first cooled air stream through the turbine may supply rotational power to the shaft.

As shown at block 416, the turbine output stream may be combined with the second cooled air stream and the second compressed air stream to obtain a combined air stream. The combined air stream may have a temperature and a flow rate.

As shown at block 418, the compressor geometry, the motor (e.g., the motor power), the first valve (e.g., the splitting state of the first valve) and the second valve (e.g., the splitting state of the second valve) may be controlled to minimize both (1) a difference between the temperature of the combined air stream and a target temperature and (2) a difference between the flow rate of the combined air stream and a target flow rate.

Accordingly, the disclosed environmental control systems and methods may be employed to control the temperature and flow rate of a cabin air stream using a single turbomachine by controlling, among other possible parameters, the compressor geometry, the motor power and the states of the valves.

Although various aspects of the disclosed environmental control system and method have been shown and described, modifications may occur to those skilled in the art upon reading the specification. The present application includes such modifications and is limited only by the scope of the claims.

What is claimed is:

1. An environmental control system comprising:
   a turbomachine assembly comprising:
   a shaft;
   a compressor driven by said shaft to output a compressed air stream;
   a turbine coupled to said shaft; and
   a motor coupled to said shaft;
   a first valve configured to split said compressed air stream into a first compressed air stream and a second compressed air stream;
   a heat exchanger positioned to cool said first compressed air stream and output a cooled air stream;
   a second valve positioned to receive said cooled air stream and split said cooled air stream into a first cooled air stream and a second cooled air stream, wherein said first cooled air stream is expanded in said turbine to produce an expanded air stream, and wherein said expanded air stream is combined with said second compressed air stream and said second cooled air stream to provide a combined air stream, said combined air stream having a temperature and a flow rate; and
   a controller configured to communicate control signals to said compressor, said motor, said first valve and said second valve to control said temperature and said flow rate of said combined air stream.

2. The environmental control system of claim 1 wherein said compressor is a variable geometry compressor.

3. The environmental control system of claim 1 wherein said turbine is configured to supply rotational power to said shaft in response to said first cooled air stream being expanded in said turbine.

4. The environmental control system of claim 1 wherein said motor is configured to selectively supply rotational power to said shaft.

5. The environmental control system of claim 1 wherein said first valve selectively splits said compressed air stream into said first compressed air stream and said second compressed air stream based on said control signals received from said controller.

6. The environmental control system of claim 1 wherein said second valve selectively splits said cooled air stream into said first cooled air stream and said second cooled air stream based on said control signals received from said controller.

7. The environmental control system of claim 1 further comprising a temperature sensor positioned to sense a temperature of said compressed air stream and communicate to said controller signals indicative of said temperature of said compressed air stream, wherein said control signals are based at least on said signals indicative of said temperature of said compressed air stream.

8. The environmental control system of claim 1 further comprising a pressure sensor positioned to sense a pressure of said compressed air stream and communicate to said controller signals indicative of said pressure of said compressed air stream, wherein said control signals are based at least on said signals indicative of said pressure of said compressed air stream.

9. The environmental control system of claim 1 further comprising a first flow sensor positioned to sense a flow rate of said cooled air stream and communicate to said controller signals indicative of said flow rate of said cooled air stream, wherein said control signals are based at least on said signals indicative of said flow rate of said cooled air stream.

10. The environmental control system of claim 1 further comprising a second flow sensor positioned to sense a flow rate of said second compressed air stream and communicate to said controller signals indicative of said flow rate of said second compressed air stream, wherein said control signals are based at least on said signals indicative of said flow rate of said second compressed air stream.

11. The environmental control system of claim 1 further comprising a second temperature sensor positioned to sense a temperature of said cooled air stream and communicate to said controller signals indicative of said temperature of said cooled air stream, wherein said control signals are based at least on said signals indicative of said temperature of said cooled air stream.

12. The environmental control system of claim 1 further comprising an airplane cabin, wherein said combined air stream is supplied to said cabin.

13. The environmental control system of claim 1 further comprising a recirculation fan configured to draw air from said cabin and combine said air drawn from said cabin with said combined air stream.

14. The environmental control system of claim 1 further comprising a water extractor configured to remove water from said cooled air stream.

15. An environmental control system comprising:
a turbomachine assembly comprising a compressor, a motor and a turbine, wherein said compressor has a variable compressor geometry and is driven by a shaft to output a compressed air stream, wherein said motor is coupled to said shaft and has a variable motor power, and wherein said turbine is coupled to said shaft;
a first valve having a first variable splitting state to selectively divide said compressed air stream into a first compressed air stream and a second compressed air stream;
a heat exchanger positioned to cool said first compressed air stream and output a cooled air stream;
a second valve having a second variable splitting state to selectively divide said cooled air stream into a first cooled air stream and a second cooled air stream, wherein said first cooled air stream is coupled to said turbine such that said turbine expands said first cooled air stream as said first cooled air stream passes through said turbine, thereby producing an expanded air stream, and wherein said expanded air stream is combined with said second compressed air stream and said second cooled air stream to provide a combined air stream, said combined air stream having a temperature and a flow rate; and
a controller configured to control said temperature and said flow rate of said combined air stream by controlling said variable compressor geometry, said variable motor power, said first variable splitting state and said second variable splitting state.

* * * * *